Feb. 18, 1930. H. D. CHURCH 1,747,504
COMPRESSOR MOUNTING FOR AUTOMOTIVE VEHICLES
Filed April 16, 1926

INVENTOR
HAROLD D. CHURCH
BY
ATTORNEY

Patented Feb. 18, 1930

1,747,504

UNITED STATES PATENT OFFICE

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO

COMPRESSOR MOUNTING FOR AUTOMOTIVE VEHICLES

Application filed April 16, 1926. Serial No. 102,599.

This invention relates to automotive engines and pertains to improvements in the mounting of an air compressor thereon.

In air compressors of the type commonly employed in motor vehicles equipped with air brakes, it is customary to construct the crank of such air compressor with throws spaced 180 degrees apart. It is also customary, mainly on account of convenience and accessibility, to support the air compressor on the forward end of the engine, but when such an arrangement is adopted, it is found that the vibrations due to the periodicity of the compressor crank are transmitted to the engine timing gears causing undue wear and noise.

The object of the present improvement is to simplify the construction of the driving connections between the engine and the air compressor and to provide a driving mechanism so supported as to prevent the periodicity of the compressor crank from being imparted to the engine gearing.

Another object of the invention is to provide a self-acting connection between the communicating oil passages in the engine crankshaft and the compressor crank in which connection fluid communication may be assured without loss of the lubricant.

Other objects of the invention and the features of novelty will be apparent from reference to the accompanying drawing of an embodiment of the invention, and in which description reference will be had to the accompanying drawings illustrating such an embodiment.

Referring to the drawings.

Figures 1, 2:
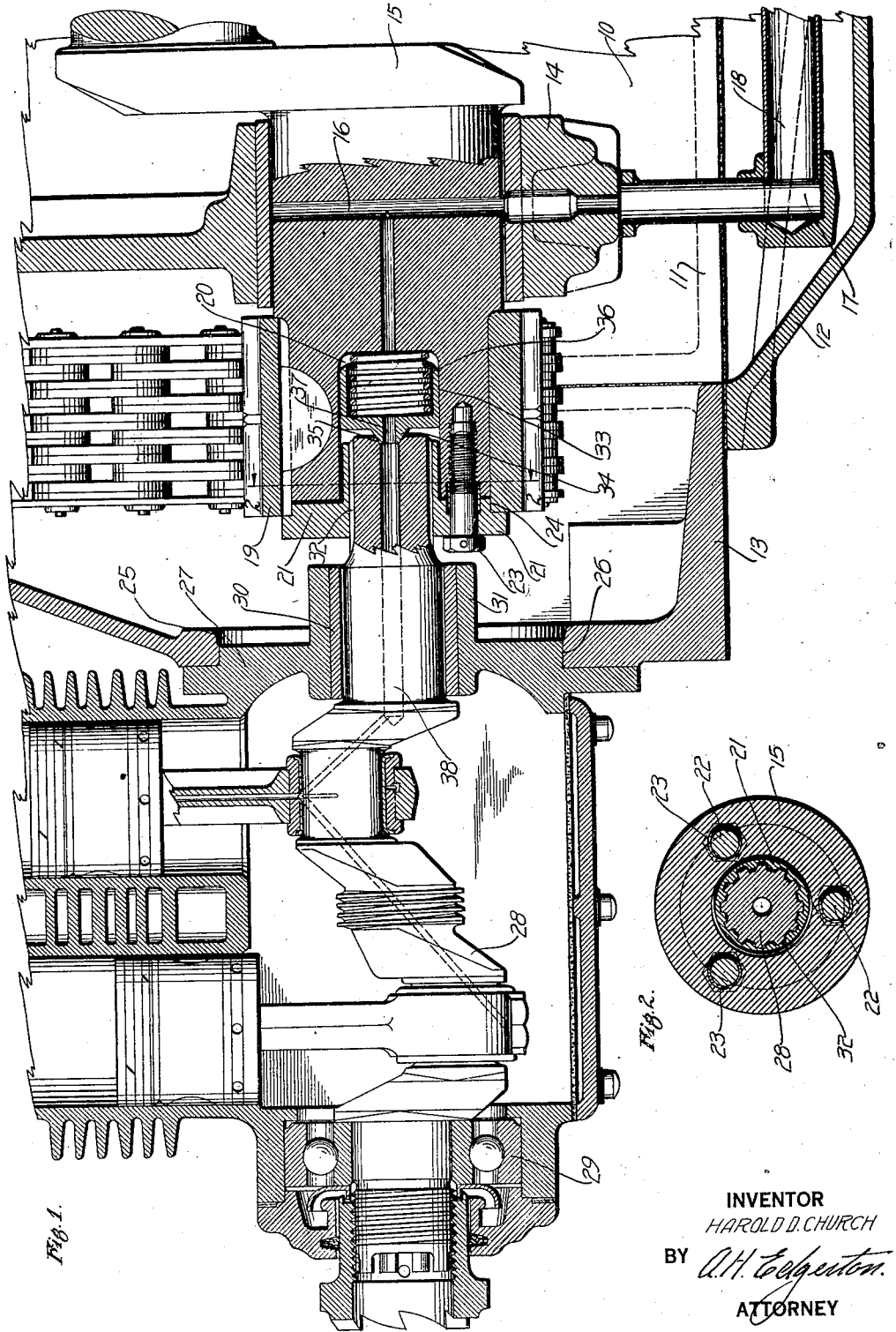
Figure 1 is a central vertical section taken through the forward portion of an internal combustion engine and an air compressor showing so much of the compressor mounting as is necessary for an understanding of the construction of the connection and the operation of the oil fitting.
Figure 2 is a transverse section taken upon a plane indicated by the lines 2—2 in Figure 1.

Referring now to all the figures of the drawing illustrating an embodiment of the invention and in all of which figures like parts are designated by like reference characters, the crankcase 10, herein illustrated is formed with laterally depending flanges 11, to which there is secured an oil pan 12, and a timing gear cover 13.

Within the crankcase 10, suitable bearing seats 14, are provided in which there is journaled a crankshaft 15, provided with oil ducts 16, which communicate with conduits 17 and 18, leading from a main source of pressure fed lubricant. The outer end of the crankshaft 15, extends beyond the bearing 14, and upon this extension there is keyed a sprocket 19, adapted to drive the camshaft in the usual manner.

An axial opening 20, is provided in the end of the crankshaft and within this opening a flanged bushing 21, is secured by means of cap screws 22, which pass through the flanged portion of the bushing and are screw threaded into the crankshaft 15. The axial alignment of the bushing 21, is assured with ring dowels 23, interposed between the abutting faces of the bushing 21, and the crank shaft. Provision is further made to maintain the alignment of the bushing with the crankshaft by the pilot seat 24, formed on the inner end of the bushing flange which is engaged by an overhanging outer portion of the gear sprocket 19.

The timing gear cover 13, is constructed with an opening 25, which is aligned with the axis of the crankshaft and which accommodates the pilot bearing 26, formed in the air compressor housing 27. Within the air compressor housing 27, a crank 28, is journalled being supported on an anti-friction bearing 29, at its forward end, and a wear bushing bearing 30, in a rearwardly disposed boss 31, integrally formed with the compressor housing 27, at the inner end thereof.

The compressor crank 28, is provided with a splined portion 32, which extends beyond the inner bearing 30, and is engaged by key seats formed by broaching the bushing 21.

Within the opening 20, a snugly fitting plunger or piston 33, is interposed between the outer end of the compressor crank and the bottom of the opening 20. The forward face of the piston 33, is provided with a frustra-conical boss 34, which is adapted to engage a complementary seat 35, in the compressor crank 28, and a compression spring 36, intermediate the bottom of the opening 20, and the rear inner wall of the piston 33, maintains a fluid tight connection between the boss 34, and the seat 35. An orifice 37, in the boss 34, is provided to maintain fluid communication between the engine lubricating system and the oil passages 38, in the compressor crank.

Assuming that lubricant is continuously supplied through the oil ducts 16, into the opening 20, it will be seen that the fluid tight piston 33, will prevent the lubricant from escaping through the splined connection between the bushing 21, and crank 28. It will also be seen that the orifice 37, will permit such volume of lubricant to flow into the oil passage 38, of the crank 28, as may be predetermined by the size of the opening 37, in the piston 33, and by virtue of the spring pressed contact between the boss 34, and the co-acting seat 35, loss of lubricant will be prevented at this point.

In the arrangement of the air compressor, in the embodiment illustrated, it will be seen that there will be a diminution of the vibrations transmitted from the air compressor to the engine as the compressor crank is supported within the engine crankshaft adjacent one of its main bearings, which bearing is of suitable size and rigidity to withstand the vibrations of the reciprocating parts of the air compressor and to resist the periodic vibrations of the compressor crank.

Having thus described my invention, what I claim and desire to secure by Letters Patent is:—

1. The combination with two axially aligned telescopically arranged shafts coupled together for simultaneous rotation and provided with lubricant passages, of means, provided with a lubricant passage connecting the lubricant passages of said shafts, carried by one of said shafts in substantially fluid tight engagement therewith and resiliently pressed into fluid tight engagement with the other of said shafts.

2. The combination with an engine crankshaft having a lubricant passage therein and an axial opening in one end thereof in fluid communication with said lubricant passage, of an air compressor crankshaft provided with a lubricant passage and telescopically arranged within said engine crankshaft, driving means intermediate said engine crankshaft and said compressor crankshaft, a source of lubricant under pressure, a spring pressed piston within said engine crankshaft opening adapted to restrictively communicate lubricant under pressure from the said engine crankshaft passage to the said compressor crankshaft passage.

3. The combination with an engine crankshaft having a lubricant passage therein and an axial opening in one end thereof in fluid communication with said lubricant passage, of an air compressor crankshaft provided with a lubricant passage and telescopically arranged within said engine crankshaft, driving means intermediate said engine crankshaft and said compressor crankshaft, a source of lubricant under pressure, a spring pressed piston within said engine crankshaft opening having a conical apertured boss on the outer face thereof and co-acting with a complementary seat in said compressor crankshaft passage.

4. The combination with an engine crankshaft having a lubricant passage therein and an axial opening in one end thereof in fluid communication with said lubricant passage, of an air compressor crankshaft provided with a lubricant passage and telescopically arranged within said engine crankshaft, driving means intermediate said engine crankshaft and said compressor crankshaft, a source of lubricant under pressure, a piston telescopically joined to one of the crankshafts and having an axial orifice through its end wall, said piston pressed into engagement with the other crankshaft, said other crankshaft presenting an axial orifice to the first named orifice.

5. The combination with an engine crankshaft having a lubricant passage therein and an axial opening in one end thereof in fluid communication with said lubricant passage, of an air compressor crankshaft provided with a lubricant passage and telescopically arranged within said engine crankshaft, driving means intermediate said engine crankshaft and said compressor crankshaft, a source of lubricant under pressure, a piston telescopically joined to one of the said crankshafts and pressed against the other crankshaft, said piston having an apertured end wall co-acting with a complementary seat in said other crankshaft.

6. The combination with two axially aligned shafts coupled together for simultaneous rotation and provided with lubricant passages, of a spring pressed plunger carried by one of said shafts having substantially fluid-tight engagement with the other of said shafts and provided with a lubricant passage connecting the lubricant passages of said shafts.

7. The combination with two axially aligned shafts coupled together for simultaneous rotation and provided with lubricant passages, of a spring pressed plunger carried by one of said shafts having telescopic substantially fluid-tight engagement with the other of said shafts and provided with a lubricant passage connecting the lubricant passages of said shafts.

8. A crankshaft extended and recessed at one end and having a lubricant passage therein, a compressor crankshaft extended at one end and having a lubricant passage, the extended end aligned with and extending into the said recess, a bushing operatively connecting the two shafts for simultaneous rotation thereof, and a member having sliding engagement with one of the shafts and aligning engagement with the other shaft and having a passage therethrough communicating with the lubricant passages in the shafts.

In testimony whereof I hereunto affix my signature this 8th day of April, 1926.

HAROLD D. CHURCH.